United States Patent
Saltz

(10) Patent No.: US 6,738,873 B2
(45) Date of Patent: May 18, 2004

(54) MEMORY MANAGEMENT SYSTEM SUPPORTING DELETION OF TRANSIENT OBJECTS

(75) Inventor: Michael K. Saltz, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 193 days.

(21) Appl. No.: 10/154,867

(22) Filed: May 24, 2002

(65) Prior Publication Data

US 2003/0221073 A1 Nov. 27, 2003

(51) Int. Cl.⁷ ............................................... G06F 12/06
(52) U.S. Cl. ..................................... 711/154; 711/165
(58) Field of Search ............................... 711/154, 165; 707/206

(56) References Cited

U.S. PATENT DOCUMENTS 6,493,730 B1 * 12/2002 Lewis et al. ............... 707/206
6,581,077 B2 * 6/2003 Sokolov et al. ............ 707/206

* cited by examiner

*Primary Examiner*—Kevin L. Ellis
(74) *Attorney, Agent, or Firm*—Park, Vaughan & Fleming LLP

(57) ABSTRACT

One embodiment of the present invention provides a system for compacting memory within a computing device, wherein the computing device supports transient objects, having a persistent portion stored in a writeable non-volatile memory, and a transient portion stored in a volatile memory. During the compaction process, the system resets the volatile memory so that information in the volatile memory is deleted. Next, the system scans through a list of objects. For each transient object encountered in the list of objects, the system allocates space for the transient object in the volatile memory. The system also updates the persistent portion of the transient object, if necessary, to specify a new location in volatile memory for the transient portion of the transient object.

22 Claims, 5 Drawing Sheets

MEMORY MANAGEMENT SYSTEM SUPPORTING DELETION OF TRANSIENT OBJECTS

RELATED APPLICATIONS

The subject matter of this application is related to the subject matter in a co-pending non-provisional application by Saqib J. Ahmad filed on the same day as the instant application, entitled, "Method and Apparatus for Deleting Objects From Memory within a Smart Card," having Serial Number TO BE ASSIGNED, and filing date TO BE ASSIGNED (Attorney Docket No. SUN-P7670-EKL).

The subject matter of this application is also related to the subject matter in a co-pending non-provisional application by the same inventor as the instant application, filed on the same day as the instant application, entitled, "Memory Management System Supporting Object Deletion in Non-volatile Memory", having Serial Number TO BE ASSIGNED, and filing date TO BE ASSIGNED(Attorney Docket No. SUN-P7698-EKL).

BACKGROUND

1. Field of the Invention

The present invention relates to the process of managing memory in a computer system. More specifically, the present invention relates to a method and an apparatus for freeing memory within a computing device, such as a smart card, which includes both volatile and non-volatile memory.

2. Related Art

Dramatic advances in computer technology presently make it possible to integrate a significant amount of computing power onto a "smart card". This increased computing power enables smart cards to support large numbers of applications. However, unlike conventional computing systems, smart card-based computing systems do not presently provide a mechanism for reclaiming memory occupied by objects that are no longer in use. This process of reclaiming unused memory is often referred to as "garbage collection".

Garbage collection can be performed in conventional computing systems using a number of well-known techniques. However, smart card-based computing systems are different than conventional computing systems because objects can reside in writeable non-volatile memory, such as electrically erasable programmable read only memory (EEPROM) or flash memory. (Within this specification the term "EEPROM" refers to both "EEPROM" and "flash memory.")

Existing garbage collection techniques are not suitable for EEPROM because individual memory elements in EEPROM can only be written to a limited number of times. Hence, existing garbage collection techniques, which operate by frequently marking objects in memory, can dramatically reduce the life expectancy of EEPROM. Moreover, the process of performing write operations to EEPROM is typically very slow, which can significantly degrade system performance.

Smart cards often contain a small amount of volatile random access memory (RAM), which does not suffer from the above-described problems of writeable non-nonvolatile memory. However, the amount of RAM is often extremely limited. Hence, it is not possible to store a complete image of EEPROM in RAM; even a bitmap representing blocks of EEPROM would take up too much space in RAM.

The garbage collection process operates by first deleting unused objects from memory. Once the objects are deleted, the memory space formerly occupied by the objects must somehow be reclaimed. In conventional computing systems, this reclamation process is typically accomplished by performing a compaction operation to eliminate "holes" in memory that arise as a consequence of deleting objects. However, a compaction operation typically involves rewriting a significant portion of memory, which tends to reduce the life expectancy of the EEPROM.

Hence, what is needed is a method and an apparatus for reclaiming memory without requiring the large number of write operations involved in performing a compaction operation.

Furthermore, in computing devices that include both EEPROM and RAM, it is possible to define "transient objects," which include a portion defined in EEPROM and a portion defined in RAM. In order to support such hybrid objects, what is needed is a method and an apparatus that reclaims memory used by these hybrid objects.

SUMMARY

One embodiment of the present invention provides a system for compacting memory within a computing device, wherein the computing device supports transient objects, having a persistent portion stored in a writeable non-volatile memory, and a transient portion stored in a volatile memory. During the compaction process, the system resets the volatile memory so that information in the volatile memory is deleted. Next, the system scans through a list of objects. For each transient object encountered in the list of objects, the system allocates space for the transient object in the volatile memory. The system also updates the persistent portion of the transient object, if necessary, to specify a new location in volatile memory for the transient portion of the transient object.

In a variation on this embodiment, the compaction can occur during an initialization of the computing device, or during an initialization of a new application on the computing device.

In a variation on this embodiment, prior to resetting the volatile memory, the system determines if compaction is needed by checking state information in the writeable non-volatile memory, wherein the state information indicates whether a transient object has been deleted. In a further variation, the state information includes separate state information for different pools of volatile memory, thereby allowing compaction of specific pools of volatile memory, without having to compact all of the volatile memory. Note that a heap in volatile memory can be divided into a number of pools.

In a variation on this embodiment, the list of objects includes: a list of transient objects in a clear-on-reset heap within the volatile memory that are to be cleared on reset of the computing device; and a list of transient objects in a clear-on-deselect heap within the volatile memory that are to be cleared when an application running on the computing device is deselected.

In a variation on this embodiment, the writeable non-volatile memory can include: electrically erasable read only memory (EEPROM), flash memory, or a magnetic memory device.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Smart Card

Figure 1:
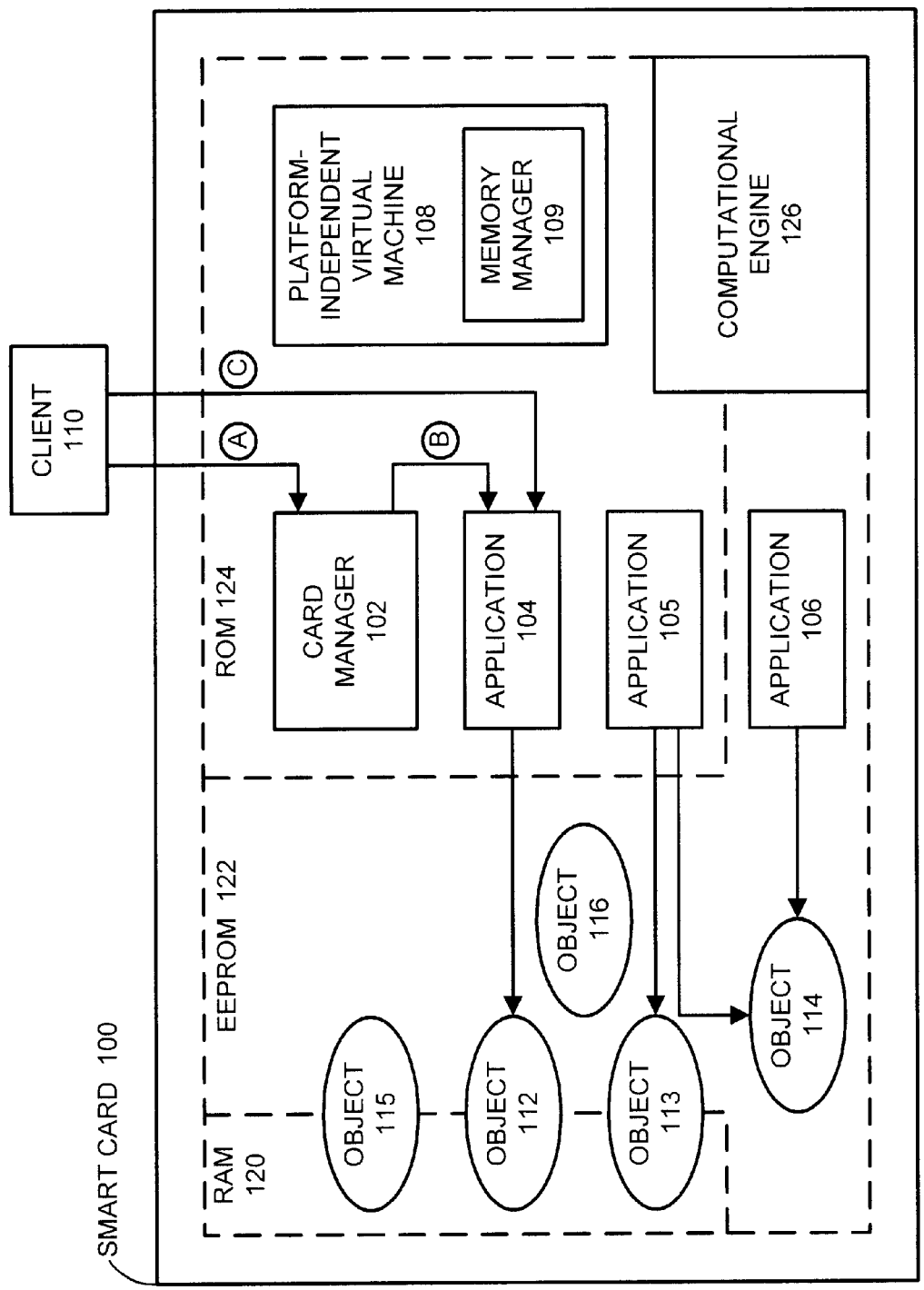
FIG. 1 illustrates a smart card in accordance with an embodiment of the present invention.

FIG. 1 illustrates a smart card 100 in accordance with an embodiment of the present invention. Smart card 100 can generally include any type of miniature computing device, such as may be located within identification cards, client loyalty cards, electronic wallets and cellular telephones. However, note that the present invention is not meant to be limited to smart cards, and can generally be applied to any type of computing device or computer system that stores objects in writeable non-volatile memory and/or volatile memory.

Smart card 100 contains a computational engine 126, which includes circuitry for performing computational operations. Smart card 100 also contains a number of different types of memory, including random access memory (RAM) 120, electrically erasable programmable read-only memory (EEPROM) 122 and read-only memory (ROM) 124. In general, RAM 120 can include any type of volatile random access memory; EEPROM 122 can include any type of writeable non-volatile memory, such as EEPROM, flash memory, or magnetic memory; and ROM 124 can include any type of read-only memory.

RAM 120 is used to store various data items and data structures. For example, as illustrated in FIG. 1, RAM 120 can contain portions of objects 112, 115 and 113. Note that objects 112, 113 and 115 are "transient objects" that include a persistent portion stored in EEPROM 122, and a transient portion stored in a RAM 120.

ROM 124 includes a virtual machine 108, such as the JAVA virtual machine developed by SUN Microsystems, Inc. of Santa Clara, Calif. Note that applications written in a platform-independent programming language, such as the JAVA programming language, can be executed on virtual machine 108.

ROM 124 also contains a number of applications, 104 and 105, which provide services for clients accessing smart card 100. Other applications, such as application 106, can be located in EEPROM 122. Further applications (not illustrated) may be located in both ROM 124 and EEPROM 122.

ROM 124 also includes a card manager 102, which contains code for managing the execution of applications on smart card 100. For example, suppose a client 110 wishes to access a service provided by one of the applications 104–106 on smart card 100. Client 110 first communicates with card manager 102 (step A). Card manager 102 puts client 110 in contact with an application 104 (step B). This allows client 110 to communicate directly with application 104 (step C). Note that card manager 102 can also delete objects from memory.

RAM 120 and EEPROM 122 and contain a number of objects 112–114, which are accessed by applications 104–105. More specifically, application 104 accesses object 112, application 105 accesses objects 113 and 114, and application 106 accesses object 114. Other objects 115–116 (that have become unlinked) are not referenced by any application. It is desirable to delete these unreferenced objects to free up memory space in RAM 120 and EEPROM 122.

Transient Object

Figure 2:
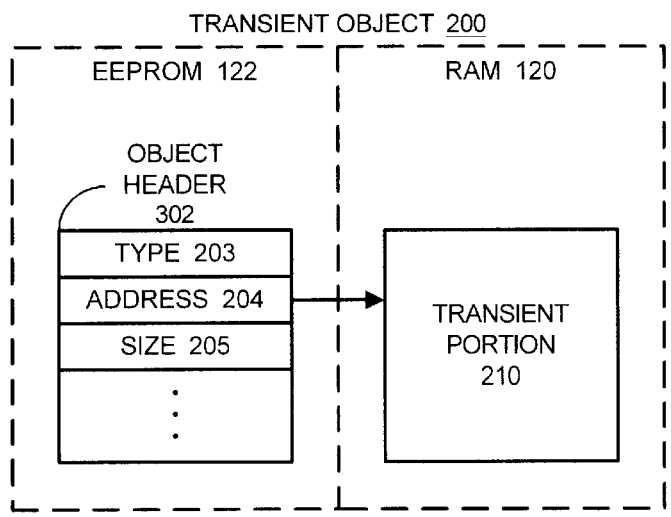
FIG. 2 illustrates a transient object in accordance with an embodiment of the present invention.

FIG. 2 illustrates a transient object 200 in accordance with an embodiment of the present invention. Transient object 200 includes a persistent portion in EEPROM 122, which contains an object header 202. Transient object 200 also includes a transient portion 210 in RAM 120, which contains data fields for the object.

Object header 202 contains various fields, including an object type field 203. Object type field 203 can specify, for example, whether transient object is a "clear-on-reset" object, which is cleared upon reset of the computing device, or a "clear-on deselect" object, which is cleared when an application running on the computing device is deselected. Object header 202 also includes an address field 204, which contains the address in RAM 120 of the transient portion 210 of transient object 200, Object header 202 also includes a size field 205, which indicates the size of the transient portion 210 of transient object 200.

Heaps and Object Tables

Figure 3:
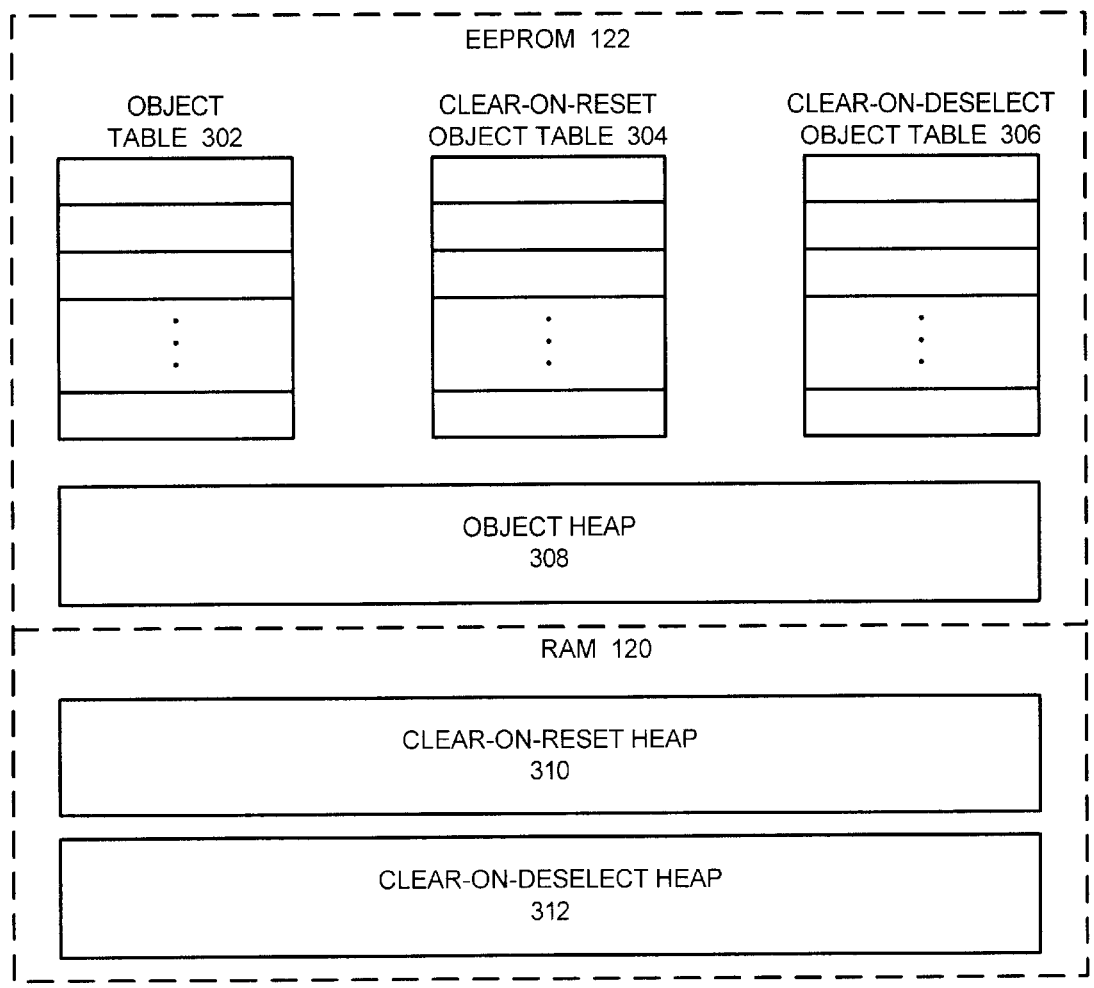
FIG. 3 illustrates memory heaps and object tables in accordance with an embodiment of the present invention.

FIG. 3 illustrates memory heaps and object tables in accordance with an embodiment of the present invention. Smart card 100 contains a number of heaps for storing objects or portions of objects.

More specifically, FIG. 3 illustrates a clear-on-reset heap 310, and a clear-on-deselect heap 312, which are both located in RAM 120. Clear-on-deselect heap 312 contains transient objects or portions of transient objects which are cleared when an application that is currently running on smart card 100 is deselected. Clear-on-reset heap contains transient objects or portions of transient objects that are cleared upon resetting of smart card 100.

FIG. 3 also illustrates an object heap 308 in EEPROM 122. Object heap 308 contains both persistent objects and the persistent portions of transient objects.

As is illustrated in FIG. 3, EEPROM 122 additionally contains a number of tables that point to objects. More specifically, EEPROM 122 contains object table 302, which points to all objects, including both persistent objects and transient objects. EEPROM 122 also contains clear-on-reset object table 304, which points to objects or portions of objects in clear-on-reset heap 310. EEPROM 122 additionally contains clear-on-deselect object table 306, which points to objects or portions of objects in clear-on-deselect heap 312. The above-described tables can be used during the process of deleting objects and during the process of freeing space used by deleted objects as is described below with reference to FIGS. 5 and 6.

Free Segment Table

Figure 4:
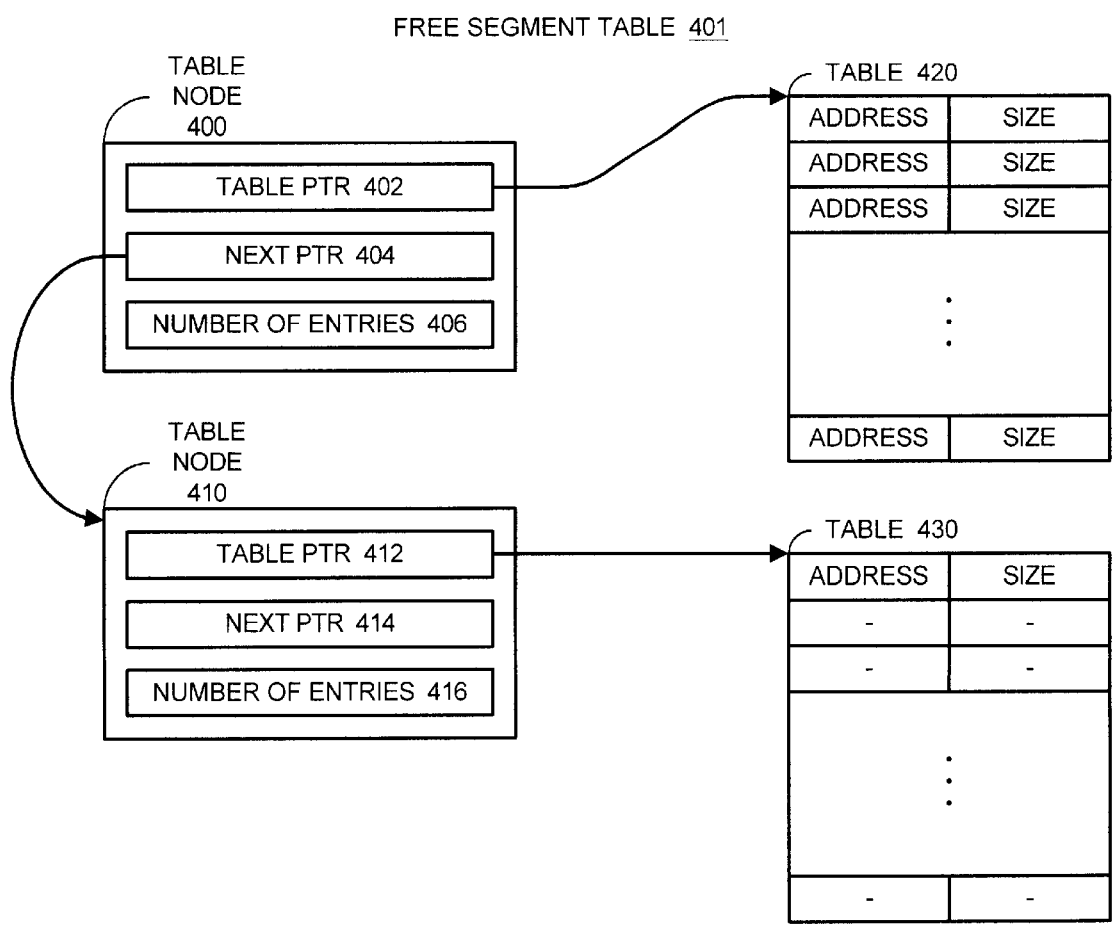
FIG. 4 illustrates a free segment table in accordance with an embodiment of the present invention.

FIG. 4 illustrates free segment table 401 in accordance with an embodiment of the present invention. Free segment table 401 is stored in EEPROM 122 and includes entries identifying free segments of memory within EEPROM 122. Free segment table 401 can be used during the process of reclaiming memory from object heap 308 in EEPROM 122. However, note that in general any type of data structure for storing segment information can be used for this purpose, and the present invention is not meant to be limited to the structure illustrated in FIG. 4.

As is illustrated in FIG. 4, free segment table 401 includes one or more table nodes, 400 and 410, which point to tables 420 and 430, respectively. More specifically, table node 400 contains a table pointer field 402, which points to table 420. Table node 400 also contains a "number of entries" field 406, which indicates how many entries are stored in table 420. Table node 400 also contains a next pointer field 404, which points to the next table node—which in FIG. 4 is table node 410. Table node 410 similarly contains a table pointer field, which points to table 430, as well as a number of entries field 416, which indicates how many entries are stored in table 430. Since there are no additional table nodes, next pointer field 414 contains a NULL value. Note that table nodes and corresponding tables are allocated as they are needed.

Table 420 contains a number of entries, each of which specifies an address and a size for a free segment of memory in object heap 308. Note that table 420 is completely full. In contrast, table 430 contains only a single segment, and the rest of table 430 is empty.

Process of Freeing a Segment of Writeable Non-volatile Memory

Figure 5:
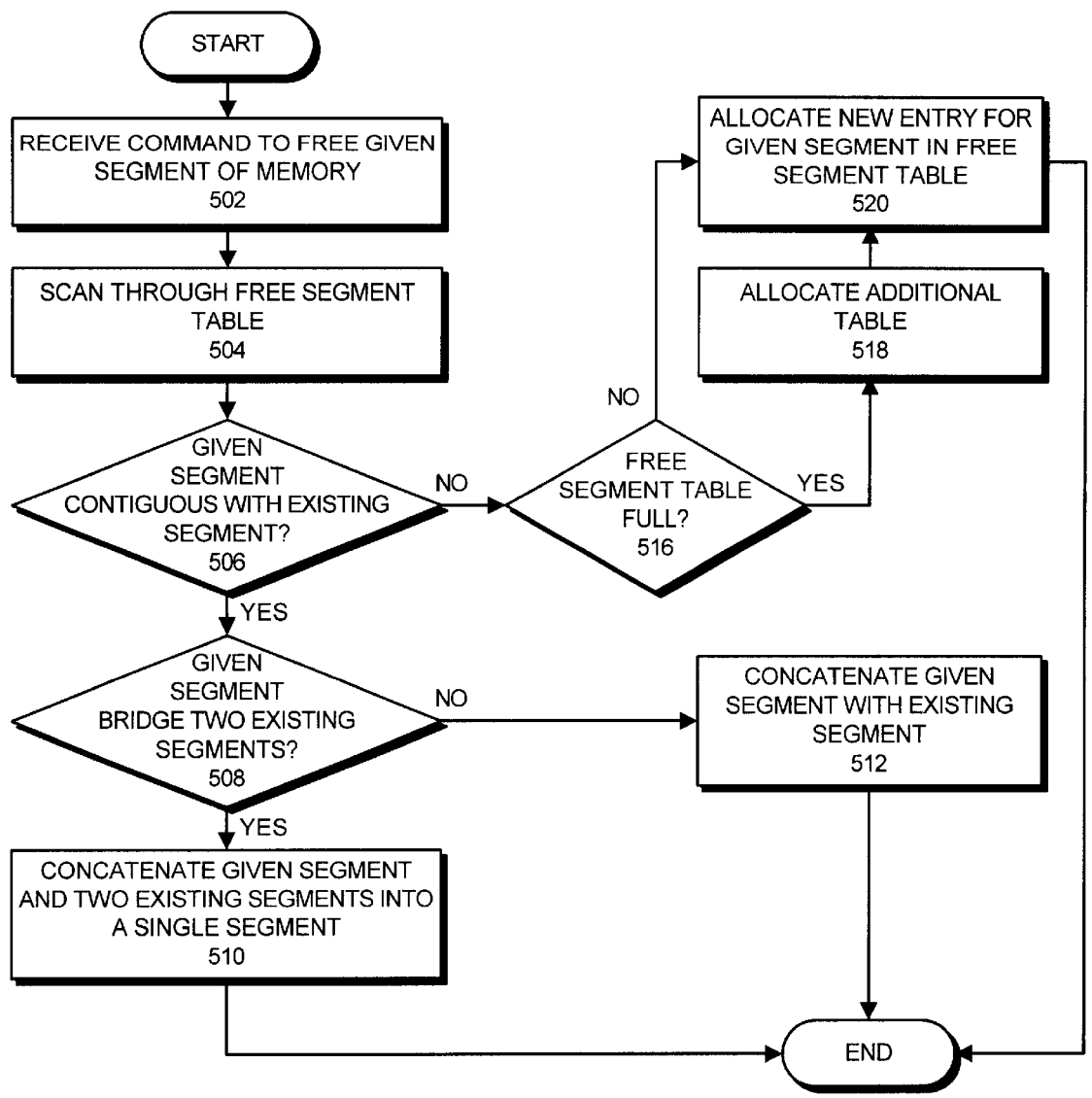
FIG. 5 is a flow chart illustrating the process of freeing a segment of memory from writeable non-volatile memory in accordance with an embodiment of the present invention.

FIG. 5 is a flow chart illustrating the process of freeing a segment of writeable non-volatile memory in accordance with an embodiment of the present invention. The process starts when the system receives a command to free a given segment of memory (step 502). This command specifies the location of the given segment and the size of the given segment. Note that the size of the given segment can be explicitly stated, or alternatively, can be determined from start and end addresses for the given segment. Also note that the segment of memory can be associated with either a persistent object that has been deleted from EEPROM 112, or a persistent portion of the transient object that has been deleted from EEPROM 112.

Note that this preceding object deletion process can involve a mark and sweep technique that marks objects in EEPROM by marking corresponding data values in RAM. This avoids unnecessary write operations to the EEPROM, which can decrease the expected life of the EEPROM.

In one embodiment of the present invention, this command is received as a method invocation or a function call during garbage collection or application deletion (which includes applet deletion and/or package deletion).

In response to the command, the system scans through free segment table 401 (step 504). During the scanning process, the system determines whether the given segment is contiguous with any existing segments in free segment table 401 (step 506). If so, the system determines if the given segment bridges two existing segments (step 508). In this case, the system concatenates the given segment with the two existing segments into a single segment (step 510). This is accomplished by increasing the size of the existing segment with the lowest base address so that it covers all three segments, and then removing the entry for the other existing segment from free segment table 401.

If the given segment does not bridge two existing segments in step 508, the system concatenates the given segment with the contiguous existing segment (step 512). This involves increasing the size of the existing segment to encompass both the existing segment and the given segment, and possibly changing the base address of the existing segment.

If at step 506, the system cannot find any contiguous segments, the system determines if free segment table 401 is full (step 516). If not, the system allocates a new entry in free segment table 401 for the given segment (step 510) and initializes this entry with the address and size of the given segment.

On the other hand, if free segment table 401 is full at step 516, the system allocates an additional table to accommodate the additional segment (step 518). In the implementation of free segment table 401 illustrated in FIG. 4, this involves allocating an additional table node. Next, the system allocates a new entry in free segment table 401 for the given segment (step 520) and then initializes this entry with the address and size of the given segment. At this point the allocation process is complete.

Note that during a subsequent allocation operation, the system allocates a new segment from free segment table 401 using a "best fit" technique that allocates the smallest segment that is large enough to accommodate the new segment. By selecting the smallest possible segment, the system tends to keep larger segments in tact. This allows the system to subsequently allocate larger segments if they are needed.

Process of Compacting Ram Containing Portions of Hybrid Objects

Figure 6:
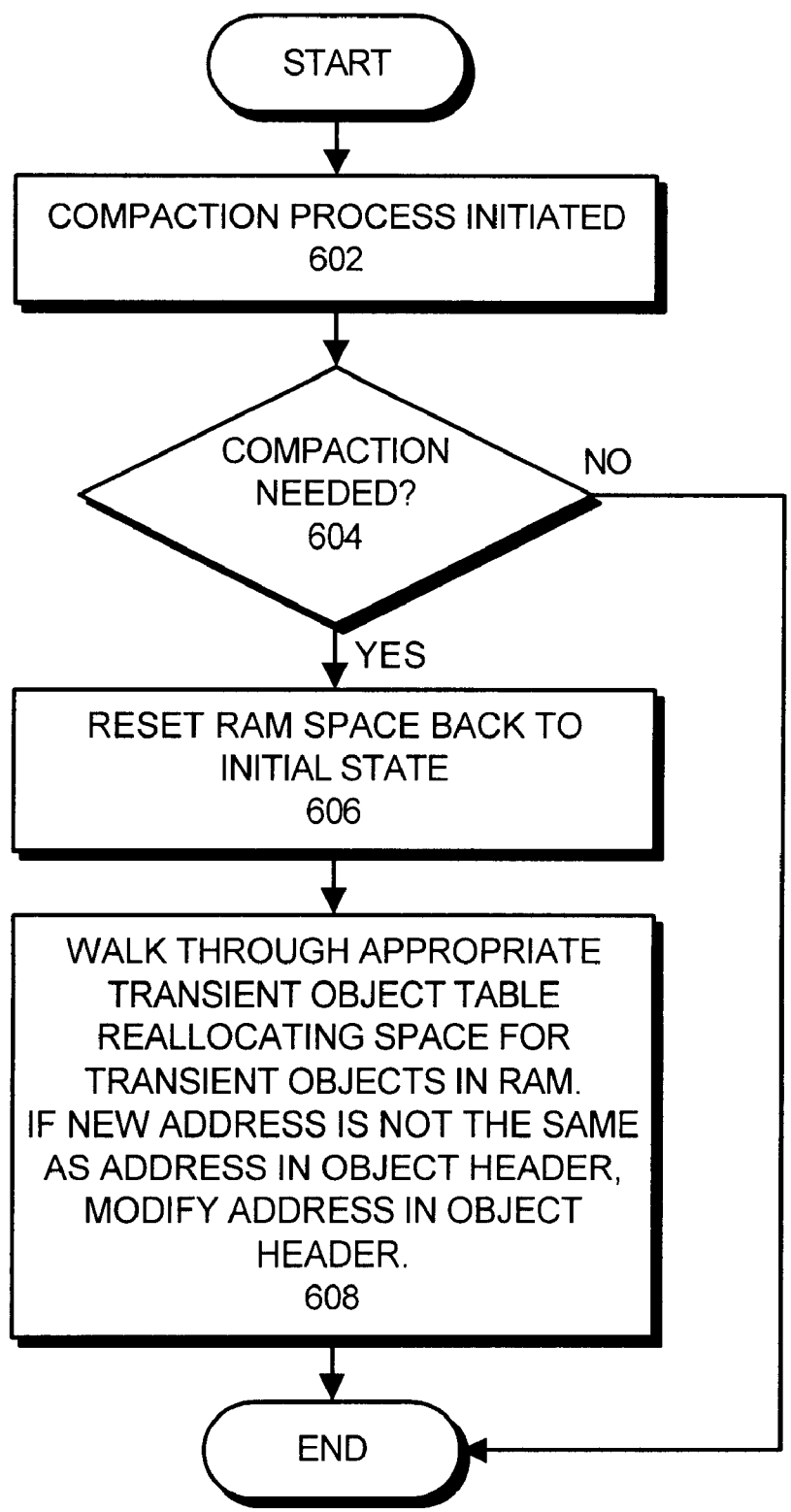
FIG. 6 is a flow chart illustrating the process of compacting RAM that contains portions of transient objects in accordance with an embodiment of the present invention.

FIG. 6 is a flow chart illustrating the process of compacting RAM containing portions of transient objects in accordance with an embodiment of the present invention. Note that this compaction process does not delete existing transient objects. It merely reclaims the memory space used by transient objects that have been deleted, and at the same time clears data stored in transient portions of transient objects. Also note that the memory occupied by the persistent portions of transient objects can be reclaimed using the process described above for persistent objects.

First, the compaction process is initiated (step 602). For example, the compaction process can be initiated upon card initialization when smart card 100 is first inserted into a card reader. Alternatively, the compaction process can be initiated upon selection of a new application (applet) to be executed on smart card 100.

Next, the system determines if compaction is needed (step 604). This involves examining state information in EEPROM 122, which indicates whether any transient objects have been deleted. This state information can be set by any process that deletes transient objects.

In one embodiment of the present invention, memory within RAM 120 is divided into a number of "pools" and the state information indicates which pools need to be compacted. This avoids having to compact all object memory in RAM 120 if only a single pool of memory in RAM 120 needs to be compacted. If the state information indicates no compaction is needed, the process terminates. Note that a heap in volatile memory can be divided into a number of pools.

Otherwise, the system starts the compaction process. This involves resetting an appropriate heap in RAM 120 back to its initial state (step 606). For example, if an application has been deselected, the system can reset clear-on-deselect heap 312 in RAM 120 (see FIG. 3).

Next, the system walks through the appropriate transient object table (for example clear-on-deselect object table 306 in FIG. 3) and reallocates space in RAM 120 for the transient objects that have not been deleted (step 608). Note that if the address of a transient object has changed, a pointer within the transient object's header, which is located in EEPROM 122, is modified to point to the new address. At this point the compaction process is complete.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for compacting memory within a computing device, wherein the computing device supports transient objects having a persistent portion stored in a writeable non-volatile memory and a transient portion stored in a volatile memory, the method comprising:
   resetting the volatile memory so that information in the volatile memory is deleted;
   scanning through a list of objects, wherein the list of objects is stored in the non-volatile memory; and
   for each transient object encountered in the list of objects,
      allocating space for the transient object in the volatile memory, and
      updating the persistent portion of the transient object, if necessary, to specify a new location in volatile memory for the transient portion of the transient object.

2. The method of claim 1, wherein the compaction can occur during:
   an initialization of the computing device; and
   an initialization of a new application on the computing device.

3. The method of claim 1, wherein prior to resetting the volatile memory, the method additionally involves determining if compaction is needed, by checking state information in the writeable non-volatile memory, wherein the state information indicates whether a transient object has been deleted.

4. The method of claim 2, wherein the state information includes separate state information for different pools of volatile memory, thereby allowing compaction of specific pools of volatile memory, without having to compact all of the volatile memory.

5. The method of claim 1, wherein the list of objects includes:
   a list of transient objects in a clear-on-reset heap within the volatile memory that are to be cleared on reset of the computing device; and
   a list of transient objects in a clear-on-deselect heap within the volatile memory that are to be cleared when an application running on the computing device is deselected.

6. The method of claim 1,
   wherein the computing device is located within a smart card that can be part of, an identification card, a client loyalty card, or an electronic wallet; or
   wherein the computing device is located within a cellular telephone.

7. The method of claim 1, wherein the writeable non-volatile memory can include one of:
   an electrically erasable read only memory (EEPROM);
   a flash memory; and
   a magnetic memory device.

8. A computer-readable storage medium storing instructions that when executed by a computer cause the computer to perform a method for compacting memory within a computing device, wherein the computing device supports transient objects having a persistent portion stored in a writeable non-volatile memory and a transient portion stored in a volatile memory, the method comprising:
   resetting the volatile memory so that information in the volatile memory is deleted;
   scanning through a list of objects, wherein the list of objects is stored in the non-volatile memory; and
   for each transient object encountered in the list of objects,
      allocating space for the transient object in the volatile memory, and
      updating the persistent portion of the transient object, if necessary, to specify a new location in volatile memory for the transient portion of the transient object.

9. The computer-readable storage medium of claim 8, wherein the compaction can occur during:
   an initialization of the computing device; and
   an initialization of a new application on the computing device.

10. The computer-readable storage medium of claim 8, wherein prior to resetting the volatile memory, the method additionally involves determining if compaction is needed, by checking state information in the writeable non-volatile memory, wherein the state information indicates whether a transient object has been deleted.

11. The computer-readable storage medium of claim 10, wherein the state information includes separate state information for different pools of volatile memory, thereby allowing compaction of specific pools of volatile memory, without having to compact all of the volatile memory.

12. The computer-readable storage medium of claim 8, wherein the list of objects includes:
   a list of transient objects in a clear-on-reset heap within the volatile memory that are to be cleared on reset of the computing device; and
   a list of transient objects in a clear-on-deselect heap within the volatile memory that are to be cleared when an application running on the computing device is deselected.

13. The computer-readable storage medium of claim 8,
   wherein the computing device is located within a smart card that can be part of, an identification card, a client loyalty card, or an electronic wallet; or
   wherein the computing device is located within a cellular telephone.

14. The computer-readable storage medium of claim 8, wherein the writeable non-volatile memory can include one of:
   an electrically erasable read only memory (EEPROM);

a flash memory; and a magnetic memory device.

15. An apparatus for compacting memory within a computing device, wherein the computing device supports transient objects having a persistent portion stored in a writeable non-volatile memory and a transient portion stored in a volatile memory, the apparatus comprising:

a resetting mechanism that is configured to reset the volatile memory so that information in the volatile memory is deleted;

an allocation mechanism that is configured to scan through a list of objects, wherein the list of objects is stored in the non-volatile memory;

wherein for each transient object encountered in the list of objects, the allocation mechanism is configured to, allocate space for the transient object in the volatile memory, and to update the persistent portion of the transient object, if necessary, to specify a new location in volatile memory for the transient portion of the transient object.

16. The apparatus of claim 15, wherein the compaction can occur during:

an initialization of the computing device; and an initialization of a new application on the computing device.

17. The apparatus of claim 15, further comprising a mechanism that determines if compaction is needed, by checking state information in the writeable non-volatile memory, wherein the state information indicates whether a transient object has been deleted.

18. The apparatus of claim 17, wherein the state information includes separate state information for different pools of volatile memory, thereby allowing compaction of specific pools of volatile memory, without having to compact all of the volatile memory.

19. The apparatus of claim 17, wherein the list of objects includes:

a list of transient objects in a clear-on-reset heap within the volatile memory that are to be cleared on reset of the computing device; and a list of transient objects in a clear-on-deselect heap within the volatile memory that are to be cleared when an application running on the computing device is deselected.

20. The apparatus of claim 17, wherein the computing device is located within a smart card that can be part of, an identification card, a client loyalty card, or an electronic wallet; or wherein the computing device is located within a cellular telephone.

21. The apparatus of claim 17, wherein the writeable non-volatile memory can include one of:

an electrically erasable read only memory (EEPROM);

a flash memory; and a magnetic memory device.

22. A means for compacting memory within a computing device, wherein the computing device supports transient objects having a persistent portion stored in a writeable non-volatile memory and a transient portion stored in a volatile memory, comprising:

a resetting means for resetting the volatile memory so that information in the volatile memory is deleted;

an allocating means for allocating space for transient objects in volatile memory; and an object updating means for updating a persistent portion of a transient object, if necessary, to specify a new location in volatile memory for the transient portion of the transient object.

* * * * *